United States Patent [19]
Park

[11] Patent Number: 5,351,086
[45] Date of Patent: Sep. 27, 1994

[54] LOW-BIT RATE INTERFRAME VIDEO ENCODER WITH ADAPTIVE TRANSFORMATION BLOCK SELECTION

[75] Inventor: Hakjae Park, Incheon, Rep. of Korea

[73] Assignee: Daewoo Electronics Co., Ltd., Seoul, Rep. of Korea

[21] Appl. No.: 997,227

[22] Filed: Dec. 28, 1992

[30] Foreign Application Priority Data

Dec. 31, 1991 [KR] Rep. of Korea .................. 91-25872

[51] Int. Cl.⁵ ...................... H04N 7/133; H04N 7/137
[52] U.S. Cl. ............................................... 348/402
[58] Field of Search ................. 358/136; 348/401, 402; H04W 7/133, 7/137

[56] References Cited

U.S. PATENT DOCUMENTS

| | | | |
|---|---|---|---|
| 4,707,738 | 11/1987 | Ferre et al. | 358/136 |
| 4,723,161 | 2/1988 | Koga | 358/136 |
| 4,821,119 | 4/1989 | Gharavi | 358/136 |
| 4,825,285 | 4/1989 | Speidel et al. | 358/136 |
| 5,025,482 | 6/1991 | Murakami et al. | 358/136 |
| 5,113,255 | 5/1992 | Nagata et al. | 358/136 |
| 5,235,419 | 8/1993 | Krause | 358/136 |

FOREIGN PATENT DOCUMENTS

0490799  6/1992  European Pat. Off. .

Primary Examiner—Tommy P. Chin
Assistant Examiner—Richard Lee
Attorney, Agent, or Firm—James D. Hall

[57] ABSTRACT

An interframe video encoder of the type known as a hybrid coder, combines the advantages of both the interfield and the interframe codings for low bit-rate video transmission. The pel elements of differential block from subtracter are rearranged and the correlation of the rearranged block is estimated. The correlation of the differential block is also provided. And then, one of the differential block and the rearranged block is subjected to two-dimensional transform according to the comparsion of the correlations.

4 Claims, 3 Drawing Sheets

LOW-BIT RATE INTERFRAME VIDEO ENCODER WITH ADAPTIVE TRANSFORMATION BLOCK SELECTION

FIELD OF INVENTION

The present invention relates to an encoding system for the transmission of video information, and, more particularly, to an interframe encoding system which allows rearrangement of a block of pel data from a digitized frame for the low bit-rate transmission of video information.

DESCRIPTION OF THE PRIOR ART

In recent years, with the dramatic growth of the information industry, a greater demand has been created for the accumulation and transmission of video information.

Practically speaking, in order to effectively achieve the accumulation and the transmission of the image data, certain image compression technique must be employed.

Among the known techniques, hybrid coding, illustrated in FIG. 1, is considered to be the most efficient compression method. (Although FIG. 1 is shown for an interframe coding system, interfield coding systems have essentially similar structures.) With reference to FIG. 1, each block of pel data from a digitized frame is fed to a subtracter 1. In the subtracter 1, each block of pel data, each element of which digitally represents the magnitude of a picture element, is compared on an element-to-element basis with the corresponding elements in a restored block from the previous frame. The resultant block of difference data is transformed to a block of transform coefficients using a two-dimensional discrete cosine transformation at a 2-D Discrete Cosine Transformer 2, and the coefficients in each block of transform coefficients are quantized at a quantizer 3 and are encoded at a variable length coder 4 for their transmission through the data channel. At the transmitter, each block and thereby the entire frame is restored by inversely quantizing and transforming the quantized coefficients and adding them to the corresponding restored pel elements of the previous frame at a summer 7. A frame memory 8 stores the restored pel elements for the next block-by-block comparison with the corresponding pel elements in the next video frame.

The encoding efficiency of an interframe encoder has been further improved by using a motion compensation prediction method. In this method, the previous frame is scanned to locate the block that most closely matches the present block within a threshold. Difference data is then formed between the present block and the matching block from the previous frame. In case there is no matching block within the threshold, no signal will be applied to the subtracter 1 from the frame memory 8 and an essentially intraframe coding will be performed. The motion compensation predictor 9 also generates a motion vector indicating the shift of the input block between the present frame and the previous frame. The motion vector, together with the variable length coded block, will be forwarded to a receiver (not shown in FIG. 1).

When the DCT (discrete cosine transformation) is used as a two-dimensional transformation algorithm in a hybrid coder, the coding efficiency depends, among other factors, also on the correlation of a block of pel data. The coding efficiency can be increased in parallel with the correlation.

The present coders may employ either an interframe coding or an interfield coding. However, either method has its own drawback which will now be described.

Given a block of pel data in a frame, the correlation of the vertical components in the block is generally high. Hence, in case of the interfield coding, where a frame is divided into an even field and an odd field and, as such, fed into the coder, the vertical correlation of an input block will be generally (and especially for a horizontally stationary video input) lower than the corresponding interframe coding. However, even with the interframe coding, the vertical correlation of an input block can still be low. This is especially true for a horizontally dynamic and highly complex video input.

SUMMARY OF THE INVENTION

Therefore, an object of the present invention is to combine the advantages of both the interfield and the interframe codings in a hybrid type coder for a low bit-rate video transmission.

Accordingly, the present invention provides an interframe video encoder for encoding an input block of pel data from a video frame comprising: means for generating a differential block of pel elements by differentially combining the pel elements of the input block with the pel elements of a block from a previous frame, which most closely matches the input block; means for transferring the differential block to an output terminal and a rearranged block of pel elements to another output terminal, said rearranged block being generated by rearranging the pel elements of the differential block; means for comparing a vertical correlation of the differential block with a vertical correlation of the rearranged block and for generating a control signal based on said comparison; means for transforming a block of pel elements into a block of transform coefficients by using a two-dimensional signal transformation; means for connecting either the differential block or the rearranged block to said transforming means according to the control signal; means for quantizing the coefficients in the block of transform coefficients; means for reconstructing the differential block according to the control signal; and means for encoding the quantized transform coefficients for their transmission in a data stream.

BRIEF DESCRIPTION OF THE DRAWINGS

FIG. 3A describes a block (16×16) of pel data from a frame before their rearrangement by the block rearranger in FIG. 2 wherein "O" represents a pel data in an odd field whereas "X" represents a pel data in an even field.

FIG. 3B illustrates a block (16×16) of pel data from the frame after their rearrangement.

DETAILED DESCRIPTION OF THE PREFERRED EMBODIMENTS

Figure 1:
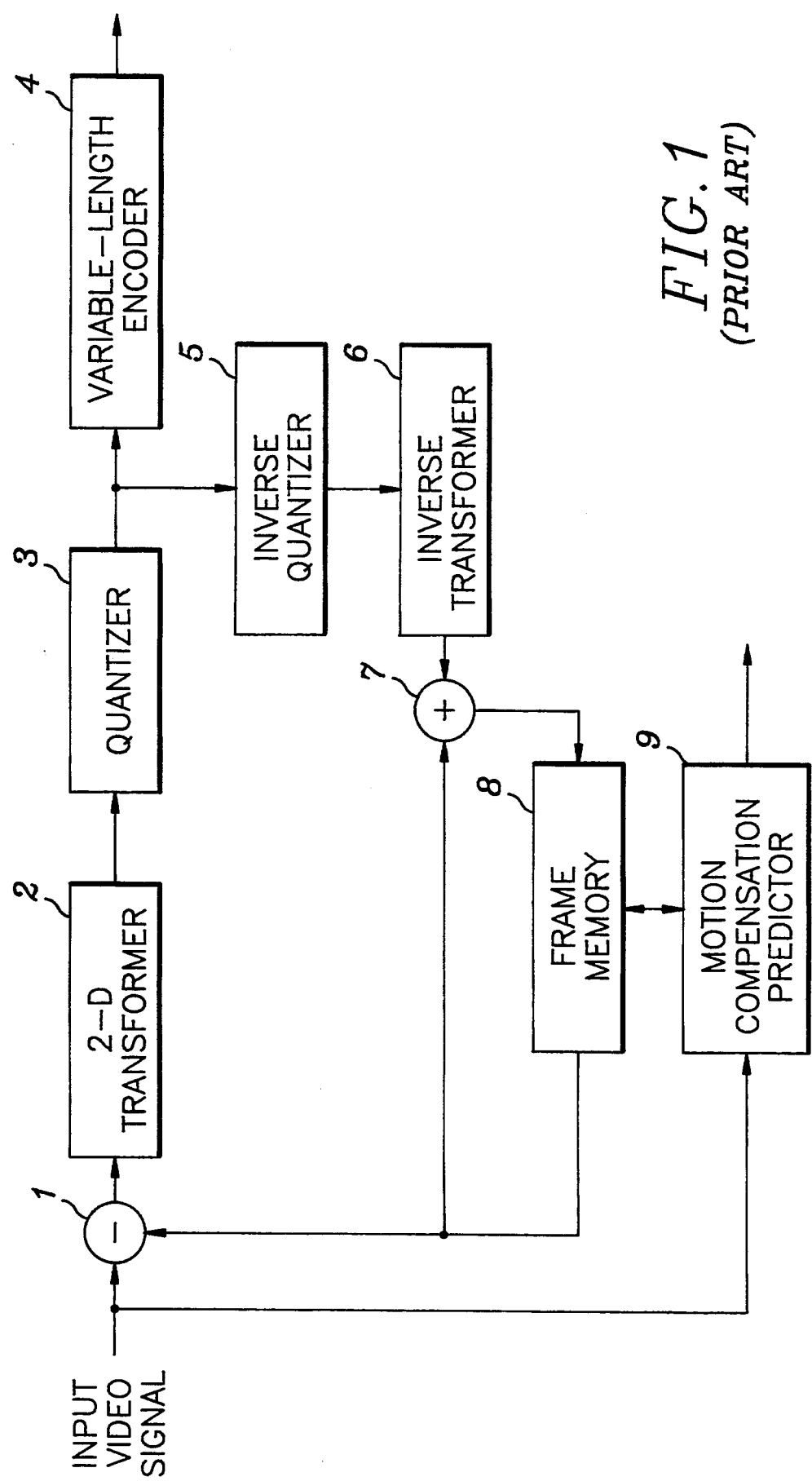
FIG. 1 shows a block diagram of a prior art hybrid coder.
Figure 2:
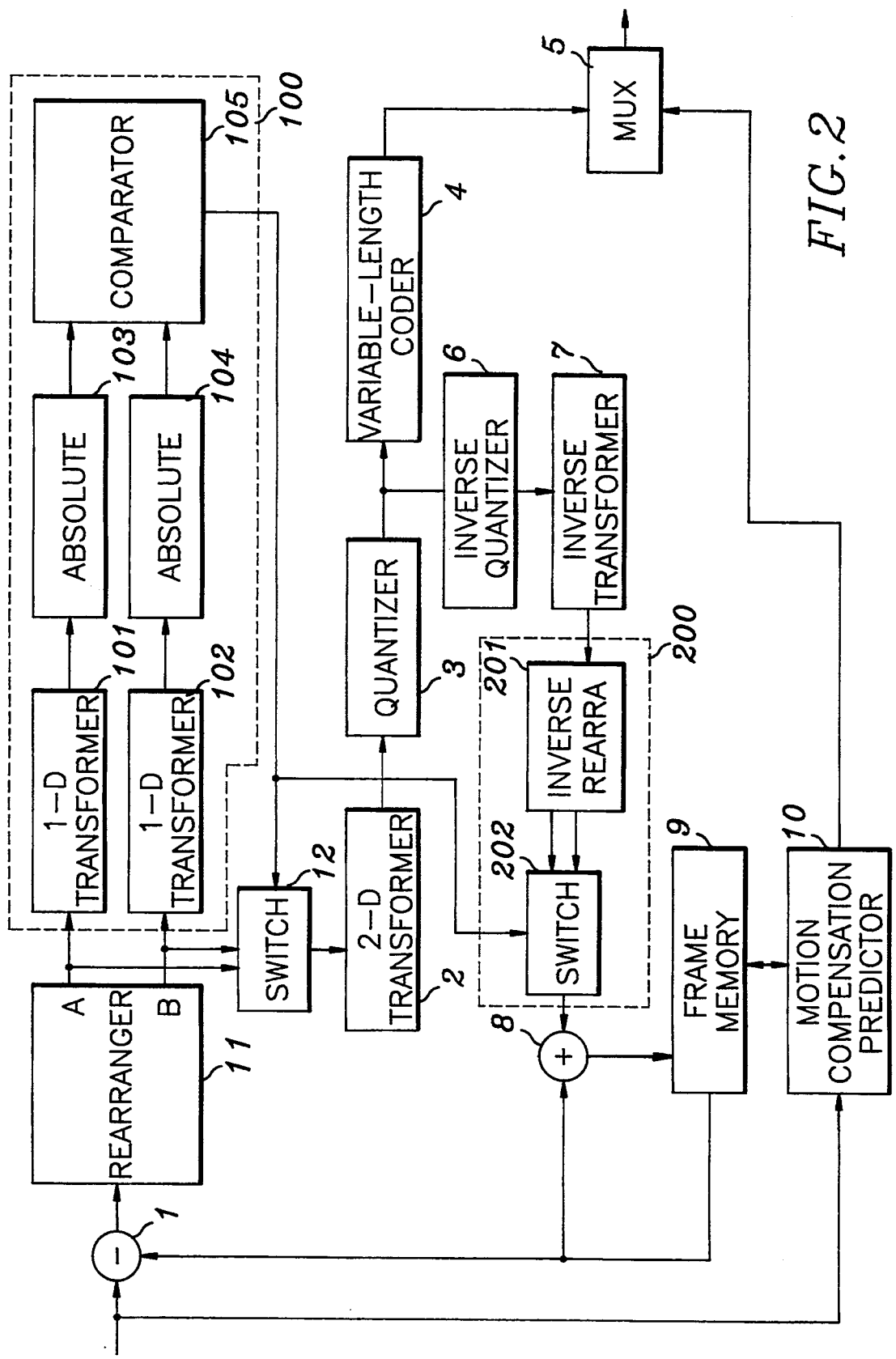
FIG. 2 represents a block diagram of a hybrid coder in accordance with the present invention.

The hybrid coder embodying the present invention, as shown in FIG. 2, comprises: a subtracter 1, a two-dimensional discrete cosine transformer 2, a quantizer 3, a variable-length coder 4, a multiplexer 5, an inverse quantizer 6, an inverse discrete cosine transformer 7, a summer 8, a frame memory 9 and a motion compensation predictor 10, as is a conventional hybrid coder, and further comprises a block rearranger 11, comparison means 100, a switch 12 and reconstructing means 200.

The m×n (for example, 8×8, 16×16, 32×16, etc.) blocks of pel data from a digitized frame of video input are applied to the subtracter 1, block-by-block. In the mean time, the frame memory 9 has in its storage blocks of pel data from the previous frame. The differential block is then formed between a present block and the most closely matching block from the previous frame.

The stored blocks in the frame memory 9 can be sent to the subtracter 1 and the summer 8 under the control of the motion compensation predictor 10. The frame memory 9 can also store the restored block from the summer 8 under the control of the motion compensation predictor 10.

The motion compensation predictor 10 searches from the frame memory 9 for a block that most closely matches the present block and then commands the memory 9 to provide the matching block to the subtracter 1 and the summer 8 (but for the predictor 10 adopted in the present invention for the increased coding efficiency, the matching block will be the block located in the corresponding position in the previous frame). Subsequently, the present block will be restored in the memory 9 replacing the matching block.

In addition, the motion compensation predictor 10 generates a motion vector representing the shift of the input block between the present frame and the previous frame for the multiplexer 5 which will be described later.

The block rearranger 11 then, on one hand, provides the differential block as it is at an output terminal A and, on the other hand, rearranges the differential block and provides the rearranged block at another output terminal B. The block rearranger 11, in the face of the differential block shown in FIG. 3A wherein "O" stands for the pel data in an odd field and "X" stands for the pel data in an even field, rearranges the block in the manner shown in FIG. 3B and produces the resultant rearranged block through the output terminal B. (Although FIGS. 3A and 3B are shown for a 16×16 block, other sizes of blocks, for example, 8×8, 32×16, etc., can also be adopted in the present invention.)

The comparison means 100 preferably comprises two one-dimensional discrete cosine transformers 101, 102, two absolute value calculation means 103, 104 and a comparator 105, and is connected with the terminals A and B at the one-dimensional discrete cosine transformers 101 and 102. The transformer 101 performs one-dimensional discrete cosine transform for each row of the differential blocks and provides their transform coefficients in the same row. Similarly, the transformer 102 performs one-dimensional discrete cosine transform for each row of the rearranged blocks and provides their transform coefficients in the same row. The transform coefficients will be arranged in each row in the ascending order of the corresponding frequencies. Hence, the first element of each row will have the transform coefficient representing the DC component of the row.

The fact that a sequence of data has relatively high correlation means: the sequence is mostly composed of relatively low frequency components. Accordingly, the higher the correlation of the sequence is, the part of the transform coefficients, representing relatively low frequencies, will become larger.

Thus, when the one-dimensional discrete cosine transformers 101 and 102 provide the first and the second transformed blocks of transform coefficients respectively, the first transformed block will be different from the second transformed block if the vertical correlation of the differential block differs from that of the rearranged block. However, because the rearranged block differs from the differential block only with respect to those columns of the differential block which have changed their column positions in the rearranged block as can be seen in FIGS. 3A and 3B, each transform coefficient in the first column of the first transformed block, representing the DC component of the corresponding row as stated above, must be equal to the corresponding transform coefficient in the first column of the second transformed block. Hence, if the absolute values of the transform coefficients in the first column are summed up for each of the first and the second blocks to determine which of the differential block and the rearranged block has a higher vertical correlation, there can be no difference therebetween. Yet, when the absolute values of the transform coefficients in the column just below the first column are summed up for each of the first and second transformed blocks, different results are obtained.

The two absolute value calculation means 103, 104 carry out the summation for the first transformed block and the second transformed block respectively. Thereafter, if the summation from the absolute calculation means 103 is larger than that of the absolute calculation means 104, in other words, if the vertical correlation of the differential block is higher than that of the rearranged block, the comparator 105 generates a first control signal for the switch 12 and the reconstructing means 200. If the above condition does not hold, the comparator 105 generates a second control signal for the switch 12 and the reconstructing means 200.

Accordingly, when the vertical correlation of the differential block is higher than that of the rearranged block, the differential block will be subjected to the two-dimensional discrete cosine transform; and, when the reverse is true, it will be the rearranged block that becomes subjected to the transform.

After the two-dimensional discrete cosine transform has been performed by the transformer 2, the transform coefficients of each transformed block are quantized by the quantizer 3 (for example, uniform quantizer) to improve the coding efficiency.

The quantized transform coefficients in each transformed and quantized block are encoded into variable-length codes such as Huffman codes by the variable length coder 4.

In the multiplexer 5, the resultant bit stream will be combined with a motion vector from the motion compensation predictor 10, and the combined data will be sent to the receiver (not shown).

Tuning now to the restoring operation of the transmitter, while each block of transformed differential coefficients is transmitted to the receiver, the actual magnitudes of the pel values in the block are restored within the transmitter for differential comparison with the pel elements in the next video frame. Accordingly, an inverse quantizer 6 remaps the quantized transform coefficients to the transform coefficient levels and an inverse transformer 7 transforms these transform coefficients back to the rearranged or differential pel element levels.

The differential pel elements can be added by the summer 8 directly to the pel elements of the previous frame stored in the frame memory 9. However, the rearranged pel elements cannot be added directly to the pel elements of the previous frame without distortion. Therefore, when the encoder transmits the rearranged block (in other words, when the comparator 105 within the comparison means 100 generates a second control signal), the rearranged pel elements must be inversely rearranged to get back their original differential pel elements before the summation at the summer 8. The inverse rearranger 201 in the reconstructing means 200 provides the inversely transformed block as it is at an output terminal and provides the inversely rearranged block at another output terminal. In consequence, the switch 202 in the reconstructing means 200 connects one of the two blocks of pel elements to the summer 8 depending on the control signal from the comparator 105.

Thereafter, the resultant restored block will be stored in the frame memory 9 for a subsequent differential comparison with the next video frame.

While the present invention has been shown and described with reference to the particular embodiment, it will be apparent to those skilled in the art that many changes and modifications may be made without departing from the spirit and scope of the invention as defined in the claims.

What is claimed is:

1. An interframe video encoder for encoding an input block of pel elements from a video frame comprising:
    means for generating a differential block of pel elements by differentially combining the pel elements of the input block with the pel elements of a block from a previous frame, which most closely matches the input block;
    means for transferring the differential block to an output terminal and a rearranged block of pel elements to another output terminal, said rearranged block being generated by rearranging the pel elements of the differential block;
    means for comparing a vertical correlation of the differential block with a vertical correlation of the rearranged block and for generating a control signal based on said means for comparing;
    means for transforming either the differential or the rearranged block of pel elements into a block of transform coefficients by using a two-dimensional signal transformation;
    means for connecting either the differential block or the rearranged block to said transforming means according to the control signal;
    means for quantizing the block of transform coefficients into a block of quantized transform coefficients;
    means for reconstructing the differential block from the block of quantized transform coefficients according to the control signal; and
    means for encoding the quantized transform coefficients for their transmission in a data stream.

2. The encoder of claim 1 wherein said comparing and control signal generating means further comprises:
    means for transforming the differential block of pel elements into a first block of transform coefficients by using one dimensional signal transformation;
    means for transforming the rearranged block of pel elements into a second block of transform coefficients by using one dimensional signal transformation;
    means for generating a first absolute value by summing up absolute values of the transform coefficients in a column of the first block;
    means for generating a second absolute value by summing up absolute values of the transform coefficients in a corresponding column of the second block; and
    means for comparing the first absolute value with the second absolute value and for generating the control signal accordingly. and for generating the control signal accordingly.

3. The encoder of claim 1 further comprising:
    means for deriving a motion vector representing a shift of the input block between the video frame and the previous frame; and
    means for combining the motion vector with the data stream.

4. The encoder of claim 2 further comprising:
    means for deriving a motion vector representing a shift of the input block between the video frame and the previous frame; and
    means for combining said motion vector with said data stream.

* * * * *